No. 759,017. PATENTED MAY 3, 1904.
C. RONDELL.
VEHICLE WHEEL.
APPLICATION FILED OCT. 5, 1903.
NO MODEL.

WITNESSES:

INVENTOR
Carl Rondell
BY
ATTORNEYS

No. 759,017.

Patented May 3, 1904.

UNITED STATES PATENT OFFICE.

CARL RONDELL, OF MINNEAPOLIS, MINNESOTA.

VEHICLE-WHEEL.

SPECIFICATION forming part of Letters Patent No. 759,017, dated May 3, 1904.

Application filed October 5, 1903. Serial No. 175,723. (No model.)

*To all whom it may concern:*

Be it known that I, CARL RONDELL, a citizen of the United States, and a resident of Minneapolis, in the county of Hennepin and State of Minnesota, have invented a new and Improved Vehicle-Wheel, of which the following is a full, clear, and exact description.

The purpose of the invention is to provide a construction of vehicle-wheels wherein the rim is formed with a continuous central outwardly-offset member segmental in cross-section, the tire, which is of flexible or yielding material, being fitted and secured to the said offset of the rim, thus providing a tread-surface of great strength, with a cushion-tire adapted to all conditions of roads and enabling an effective wheel to be manufactured at a minimum of cost.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1:
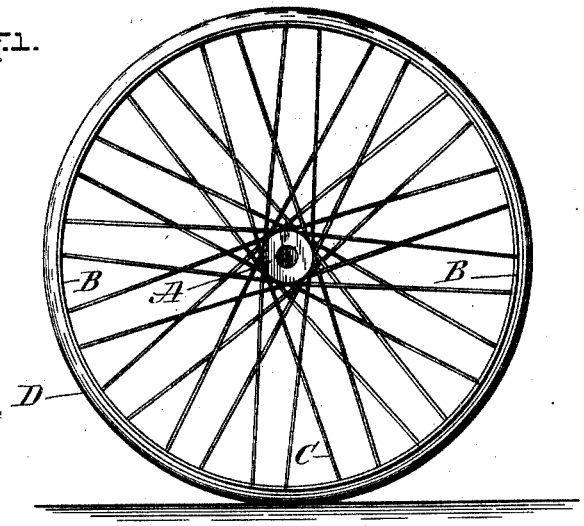
Figure 2:
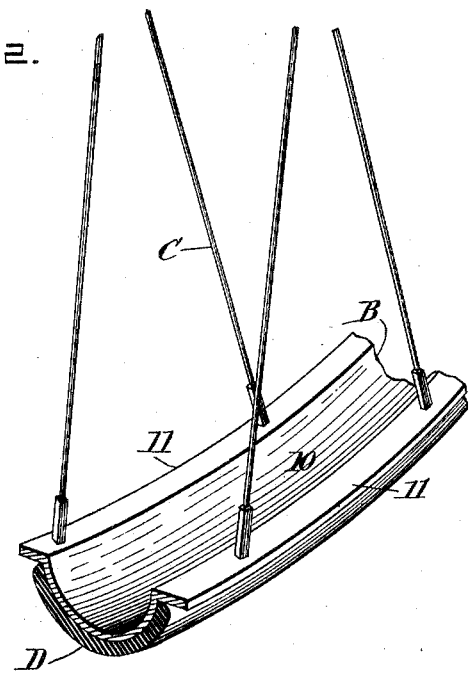

Figure 1 is a side elevation of the improved wheel, and Fig. 2 is a fragmentary perspective view of the wheel drawn upon an enlarged scale.

A represents the hub of the wheel; B, the rim; C, the spokes, and D the tire. The rim B comprises a central member or section 10, outwardly offset and segmental in cross-section, as is shown in Fig. 2, and side flanges 11, the flanges 11 and the offset central section 10 being continuous. The spokes C are secured at one end to the flanges 11 and at their opposite ends to the hub A.

The rim B is preferably made of aluminium, although any suitable material may be employed, and the tire D is a cushion-tire, being preferably made of solid rubber, although an inflated tire may be employed, and the said tire D is endless and is perfectly fitted to the outer convexed surface of the central member 10 of the rim. Although the tire will remain on the said offset member of the rim without being secured thereto, it is preferably attached to the rim by a cement or other well-known means, so as to prevent the possibility of the tire creeping on the rim.

A wheel constructed as described is adapted for use in connection with any form of wheeled vehicle and is exceedingly strong, simple, and durable and well adapted for use on roads of any description.

Having thus described my invention, I claim as new and desire to secure by Letters Patent—

1. In a vehicle-wheel, a rim consisting of an outwardly-offset, continuous central section, flanges continuous with the side edges of the central section, a hub, spokes secured to the hub and flanges, and a cushion-tire located upon the exterior of the central segmental section of the wheel-rim, as set forth.

2. In a vehicle-wheel, a rim consisting of an outwardly-offset, continuous central segmental section, means at each side of said section for attachment to the spokes of the wheel, and a cushioned tire located on the exterior of the central segmental section of the wheel-rim.

In testimony whereof I have signed my name to this specification in the presence of two subscribing witnesses.

CARL RONDELL.

Witnesses:
A. J. DUGAN,
C. E. SACKETT.